United States Patent
Iorio et al.

(10) Patent No.: US 9,209,703 B2
(45) Date of Patent: Dec. 8, 2015

(54) CONTROL DEVICE FOR A RECTIFIER OF A SWITCHING CONVERTER

(71) Applicant: DORA S.p.A., Aosta (IT)

(72) Inventors: Alberto Iorio, Aosta (IT); Maurizio Foresta, Aosta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 14/459,164

(22) Filed: Aug. 13, 2014

(65) Prior Publication Data

US 2015/0049521 A1  Feb. 19, 2015

(30) Foreign Application Priority Data

Aug. 14, 2013  (IT) ................ MI2013A1393

(51) Int. Cl.
*H02M 3/335* (2006.01)
*H02M 3/158* (2006.01)

(52) U.S. Cl.
CPC ........ *H02M 3/33592* (2013.01); *H02M 3/1588* (2013.01)

(58) Field of Classification Search
CPC .......... H02M 3/33592; H02M 3/1588; H02M 2001/0058
See application file for complete search history.

(56) References Cited

U.S. PATENT DOCUMENTS

| | | | | |
|---|---|---|---|---|
| 6,057,607 | A * | 5/2000 | Rader et al. ................ 307/11 |
| 6,307,356 | B1 * | 10/2001 | Dwelley .................... 323/282 |
| 7,141,956 | B2 * | 11/2006 | Chapuis .................... 323/283 |
| 7,292,018 | B2 * | 11/2007 | Chen ........................ 323/282 |
| 7,599,198 | B2 * | 10/2009 | Tao et al. ..................... 363/17 |
| 8,638,571 | B2 * | 1/2014 | Tschirhart et al. ............. 363/17 |
| 8,841,894 | B1 * | 9/2014 | Naraghi et al. ............. 323/282 |
| 2002/0141209 | A1 | 10/2002 | Bridge |
| 2004/0136207 | A1 * | 7/2004 | Havanur .................. 363/21.06 |
| 2004/0240243 | A1 * | 12/2004 | Meyer et al. ............... 363/127 |
| 2005/0024908 | A1 * | 2/2005 | Gizara ...................... 363/147 |
| 2005/0265058 | A1 * | 12/2005 | Stevanovic et al. ......... 363/131 |
| 2006/0152204 | A1 * | 7/2006 | Maksimovic et al. ....... 323/284 |
| 2007/0008757 | A1 * | 1/2007 | Usui et al. ................. 363/125 |
| 2008/0246455 | A1 * | 10/2008 | Chu et al. .................. 323/283 |
| 2009/0016083 | A1 * | 1/2009 | Soldano et al. .............. 363/20 |
| 2009/0027024 | A1 * | 1/2009 | Dequina .................... 323/283 |
| 2009/0161396 | A1 * | 6/2009 | Lin et al. ................... 363/125 |
| 2009/0213623 | A1 * | 8/2009 | Yang .......................... 363/49 |
| 2009/0231895 | A1 * | 9/2009 | Hu ............................ 363/127 |
| 2009/0244932 | A1 * | 10/2009 | Lin .......................... 363/21.06 |
| 2010/0103704 | A1 * | 4/2010 | Adragna et al. ......... 363/21.02 |
| 2010/0103710 | A1 * | 4/2010 | Reddy ...................... 363/127 |

(Continued)

*Primary Examiner* — Timothy J Dole
*Assistant Examiner* — Yusef Ahmed
(74) *Attorney, Agent, or Firm* — Seed IP Law Group PLLC

(57) ABSTRACT

A control device for a rectifier of a switching converter that includes a rectifier with at least one MOS transistor and a control device that is configured to generate a turn on and off signal for the at least one transistor. The control device also includes a measuring circuit to measure the conduction time of the body diode of the at least one transistor during each converter switching half-cycle. The control device is configured to, cycle by cycle: verify if the drain-source voltage of the at least one transistor is greater or less than a voltage threshold, and if the drain-source voltage is greater than the voltage threshold to turn off the at least one transistor, measure the conduction time of the body diode and increase the voltage threshold by a quantity in the next switching cycle.

13 Claims, 12 Drawing Sheets

(56) References Cited

U.S. PATENT DOCUMENTS

| | | |
|---|---|---|
| 2010/0124086 A1 | 5/2010 | Chen |
| 2010/0156366 A1* | 6/2010 | Sakai et al. .................. 323/282 |
| 2010/0188871 A1* | 7/2010 | Kim et al. .................. 363/21.03 |
| 2011/0018515 A1* | 1/2011 | McCloy-Stevens .......... 323/284 |
| 2011/0018516 A1* | 1/2011 | Notman et al. ............... 323/284 |
| 2011/0101879 A1* | 5/2011 | McNay ......................... 315/247 |
| 2011/0140679 A1* | 6/2011 | Xu et al. ....................... 323/290 |
| 2011/0267844 A1* | 11/2011 | He et al. ..................... 363/21.02 |
| 2012/0033453 A1* | 2/2012 | Gong .......................... 363/21.02 |
| 2012/0230064 A1* | 9/2012 | Yang et al. ................. 363/21.15 |
| 2012/0236603 A1* | 9/2012 | Chen et al. ................... 363/21.1 |
| 2012/0281434 A1* | 11/2012 | Lin et al. .................... 363/21.02 |
| 2013/0010502 A1* | 1/2013 | Chen .......................... 363/21.02 |
| 2013/0057173 A1* | 3/2013 | Yao et al. ...................... 315/206 |
| 2013/0094253 A1* | 4/2013 | Yang et al. ................. 363/21.15 |
| 2013/0272036 A1* | 10/2013 | Fang .......................... 363/21.17 |
| 2014/0334193 A1* | 11/2014 | Meyer et al. ............... 363/21.01 |

* cited by examiner

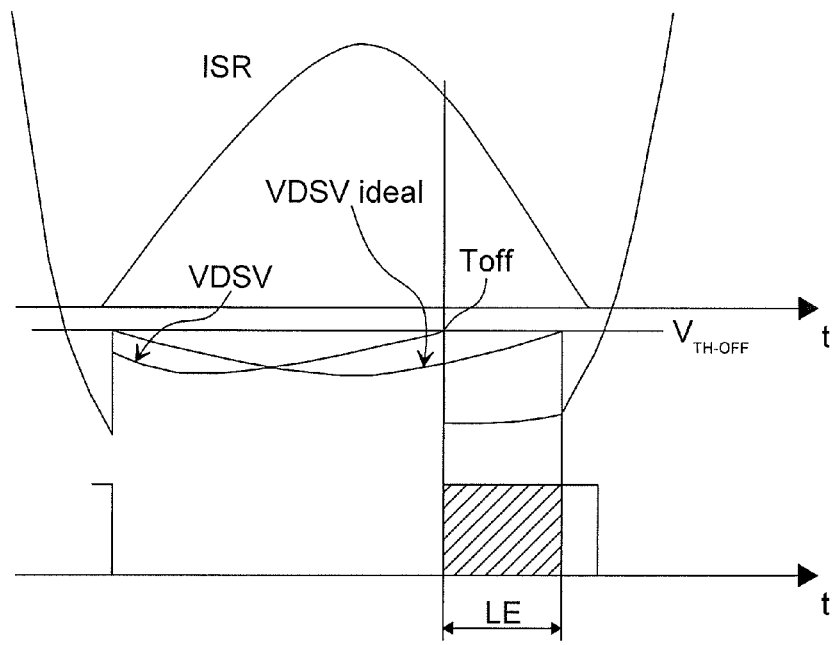
Fig.4
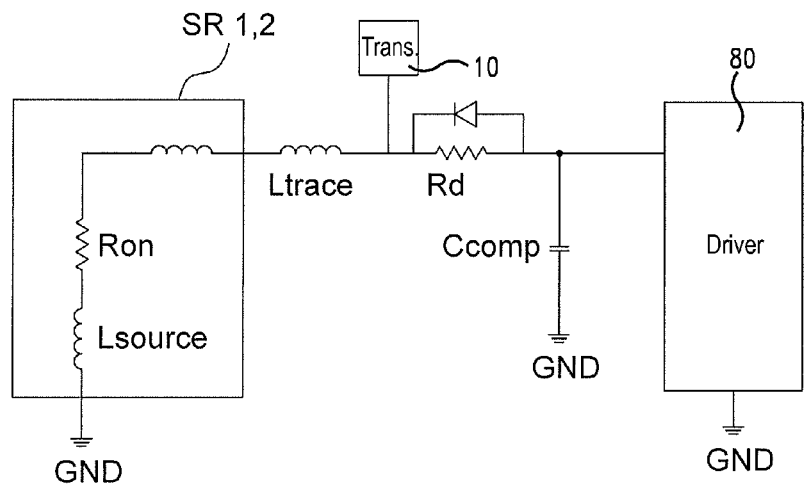
Fig.5 *(Prior Art)*

CONTROL DEVICE FOR A RECTIFIER OF A SWITCHING CONVERTER

BACKGROUND

1. Technical Field

The present disclosure relates to a control device for a rectifier of a switching converter.

2. Description of the Related Art

Resonant converters are a large class of forced switching converters characterized by the presence of a half-bridge or a full-bridge circuit topology. In the half-bridge version, for example, the switching elements comprise a high-side transistor and a low-side transistor connected in series between an input voltage and ground. A square wave having a high value corresponding to the power supply voltage and a low value corresponding to ground may be generated by conveniently switching the two transistors.

The square wave generated by the half-bridge is applied to the primary winding of a transformer by means of a resonant circuit which comprises at least one capacitor and one inductor. The secondary winding of the transformer is connected with a rectifier circuit and a filter to provide an output direct voltage depending on the frequency of the square wave.

At present, one of the resonant converters most widely used is the LLC resonant converter. This name derives from the fact that the resonant circuit employs two inductors (L) and a capacitor (C). A schematic circuit of an LLC resonant converter is shown in FIG. 1 and comprises a half-bridge of MOSFET transistors M1 and M2, with respective body diodes Db1 and Db2, coupled between an input voltage Vin and ground GND and driven by a driver circuit 3. The common terminal between transistors M1 and M2 is connected to a resonant network 2 comprising a series of a first inductance Lr, a second inductance Lm and a capacitor Cr; the inductance Lm is connected in parallel to a transformer 10 comprising a secondary winding connected to the parallel of a capacitor Co and a resistance Rout by means of the rectifier diodes D1 and D2. The output voltage Vo of the resonant converter is the voltage across said parallel, while the output current Io flows through the resistance Rout.

These resonant converters are characterized by a high conversion efficiency (>95% is easily achievable), an ability to work at high frequencies, low generation of EMI (Electro-Magnetic Interference).

In current types of converter circuits, a high conversion efficiency and high power density are desired, as in the case, for example, of the AC-DC adaptors of notebooks. LLC resonant converters are at present the converters that best meet such requirements.

However, the maximum efficiency achievable is limited by the losses in the rectifiers on the secondary side of the converter, which account for over 60% of total losses.

It is known that in order to significantly reduce the losses connected to secondary rectification, recourse can be made to the so-called "synchronous rectification" technique, in which rectifier diodes are replaced by power MOSFETs, with a suitably low on-resistance, such that the voltage drop across it is significantly lower than that across the diode; and they are driven in such a manner as to be functionally equivalent to the diode. This technique is widely adopted in traditional converters, especially in flyback and forward converters, for which there also exist commercially available dedicated integrated control circuits. There is an increasingly pressing desire to adopt this technique in resonant converters as well, in particular in LLC converters, in order to enhance their efficiency as much as possible.

FIG. 2 shows the converter of FIG. 1 in the version with secondary synchronous rectifiers; in this case, in the place of diodes D1 and D2 there are two transistors SR1 and SR2, suitably driven by two signals G1S and G2S deriving from a driver 80, and connected between the terminals of the two parts of the center-tapped secondary winding connected to ground GND, while the parallel of Co and Rout is disposed between the center tap of the secondary winding and ground GND. From a functional viewpoint there is no difference, as compared to the schematic in FIG. 1.

The transistors SR1 and SR2 have respective body diodes Dbr1 and Dbr2, and are both driven by a synchronous rectifier driver 80. The output voltage Vo of the resonant converter is the voltage across said parallel, while the output current Io flows through the resistance Rout.

In operation, the transistors SR1 and SR2 are driven in such a manner to be alternatively turned-on at a certain frequency by the synchronous rectifier driver. When the body diode Dbr1, Dbr2 of one of the transistors SR1, SR2 starts conducting the relative transistor is turned-on, while when the current is approaching zero the transistor is turned-off; in this way the use of the transistors SR1, SR2 causes a lower voltage drop than the use of the diodes D1, D2 and the power dissipation is reduced.

Particularly, as is shown in FIG. 3, a phase A is activated when the voltage Vdvs between the drain and source terminals of one of the transistor SR1, SR2, for example the voltage Vdvs1 of the transistor SR1, is lower than a voltage value of 0.7V the relative body diode Dbr1 starts conducting; then when the voltage Vdvs falls under a turn-on threshold voltage $V_{TH\_ON}$ and after a fixed delay time period $T_{PD\_ON}$, when the voltage Vdvs is maintained under the turn-on threshold voltage $V_{TH\_ON}$, the transistor SR1 is turned on from the driver.

After the turn on of the transistor SR1, in a phase B, the voltage Vdvs1 has a value of Vdvs=−Rdson×Isr, wherein Rdson is the on resistance of the transistor SR1 and Isr is the current flowing through the electric path between the center-tap CT of the secondary winding of the transformer and ground GND.

When the voltage Vdvs has a value higher than a second threshold voltage $V_{TH\_OFF}$, the transistor SR1 is turned off by the rectifier driver 80. The respective body diode Dbr1 conducts again and the voltage Vdvs goes negative; when the voltage Vdvs1 reaches the value of 1.4V, the drive circuit relative to the transistor SR2 is enabled.

However, the voltage Vdvs1, Vdvs2 depends on the parasitic elements of the source and drain terminal of the transistor SR1, SR2 and of the path of printed circuit board (PCB) from the drain terminal of the transistor SR1, SR2 and the terminal of the secondary winding. Particularly, the voltage Vdvs1, Vdvs2 depends on the parasitic inductances Lsource and Ldrain associated to the source and drain terminal of the transistor SR1, SR2 and on the parasitic inductance Ltrace relative to the path of printed circuit board (PCB) from drain terminal of the transistor SR1 or SR2 and the terminal of the secondary winding, therefore $$Vdvs = -Rdson \times Isr - (Ldrain + Lsource + Ltrace) \times \frac{\partial Isr}{\partial t},$$

where when Vdvs and Isr are indicated as one of the voltages Vdvs1, Vdvs2 and the currents Isr1, Isr2; the parasitic inductances make the sensed voltage Vdvs1, Vdvs2 different from the ideal voltage drop value on Rdson.

The presence of the parasitic inductances Ldrain, Lsource and Ltrace determines an undesired earlier turn-off of the transistors SR1, SR2 as shown in FIG. 4 where the drain-source voltage Vdvs and the desired voltage Vdvs-ideal are shown. The residual conduction time $T_{diode}$ of the body diode Dbr1 or Dbr2 increases, causing a loss of efficiency (indicate with LE in FIG. 4) due to the higher voltage drop across the body diode Dbr1 or Dbr2.

For example, a typical starting body diode residual conduction time $T_{diode}$ could be of 1 micro second, while a typically desired time $T_{diode}$ value is 60 nanoseconds.

A known technique to avoid the earlier turn-off of the transistors SR1, SR2 (FIG. 5) is to compensate the time anticipation due to the parasitic inductances by adding an RC filter downstream the rectifier driver 80 and before the transformer 10. The RC filter comprises an external capacitor Ccomp and a tunable resistor Rd. Current inversion has to be avoided to prevent converter malfunctions and failure.

This solution has the advantages of providing a simple architecture with a consequent low cost in term of silicon area and good performance.

However, external components to optimize efficiency are needed. Furthermore the RC compensation of the of the parasitic inductances Ldrain, Lsource and Ltrace may cause a delay to turn on the transistors SR1, SR2; a bypass diode arranged in parallel to the resistor Rd eliminates this turn-on time delay. Furthermore, a resistor, of the value of about 100-200Ω, arranged in series to the bypass diode (not shown in FIG. 4) is typically used to limit the current Isr1,2 in the case wherein the voltage Vdvs goes excessively under ground GND.

Also the efficiency of the solution of prior art is dependent on the residual conduction time of the body diodes Dbr1, Dbr2 which in turn depends on the on resistances of the transistors SR1, SR2, on the parasitic elements of the transistors and the printed circuit board wherein the transistors are implemented, on the temperature and on the slew rate of the current flowing through the transistor.

Furthermore, during fast load transient, for example when the LLC converter works above resonance, there is the risk of an inversion of the current flowing through the transistor SR1, SR2 and consequently of a malfunction and even failure of the converter.

BRIEF SUMMARY

One aspect of the present disclosure is to provide a control device for a rectifier of a switching converter which overcomes the problems due to the current inversion.

One aspect of the present disclosure is a control device for a rectifier of a switching converter, the rectifier comprising at least one MOS transistor, the control device being configured to generate a turn on and off signal of the at least one transistor, wherein the control device comprises a measuring circuit to measure the conduction time of the body diode of at least one transistor during each converter switching half-cycle, the control device being configured to, cycle by cycle:

verify if the drain-source voltage of the at least one transistor is equal to or less than a voltage threshold, in the case wherein the drain-source voltage is greater than the voltage threshold turns off the at least one transistor, measure the conduction time of the body diode and increase the voltage threshold by a quantity in the next switching cycle.

BRIEF DESCRIPTION OF THE SEVERAL VIEWS OF THE DRAWINGS

For a better understanding of the present disclosure, a preferred embodiment thereof is now described, purely by way of non-limiting example and with reference to the annexed drawings, wherein:

FIG. 4 shows the waveforms of the current flowing through one transistor of the rectifier in FIG. 2 with a premature turning off of the transistor;

FIG. 5 shows a transistor of the rectifiers of FIG. 2 with the parasitic elements, an RC compensation filter and a bypass diode;

DETAILED DESCRIPTION

Figure 1:
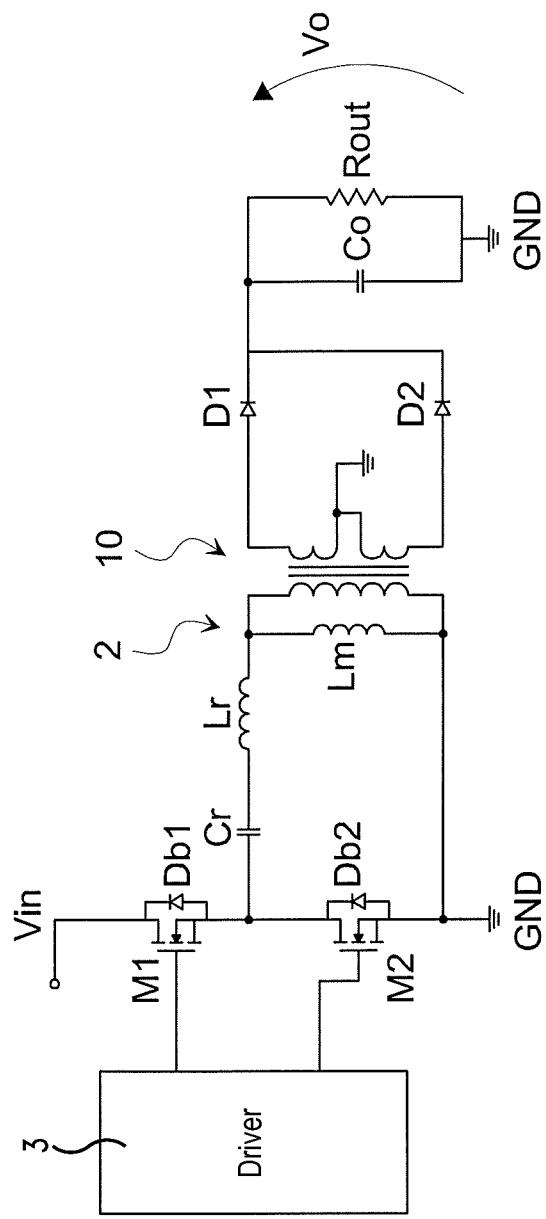
FIG. 1 is a diagram of an LLC-type resonant converter with a center-tapped secondary winding and rectification of the output current by means of diodes according to prior art.
Figure 2:
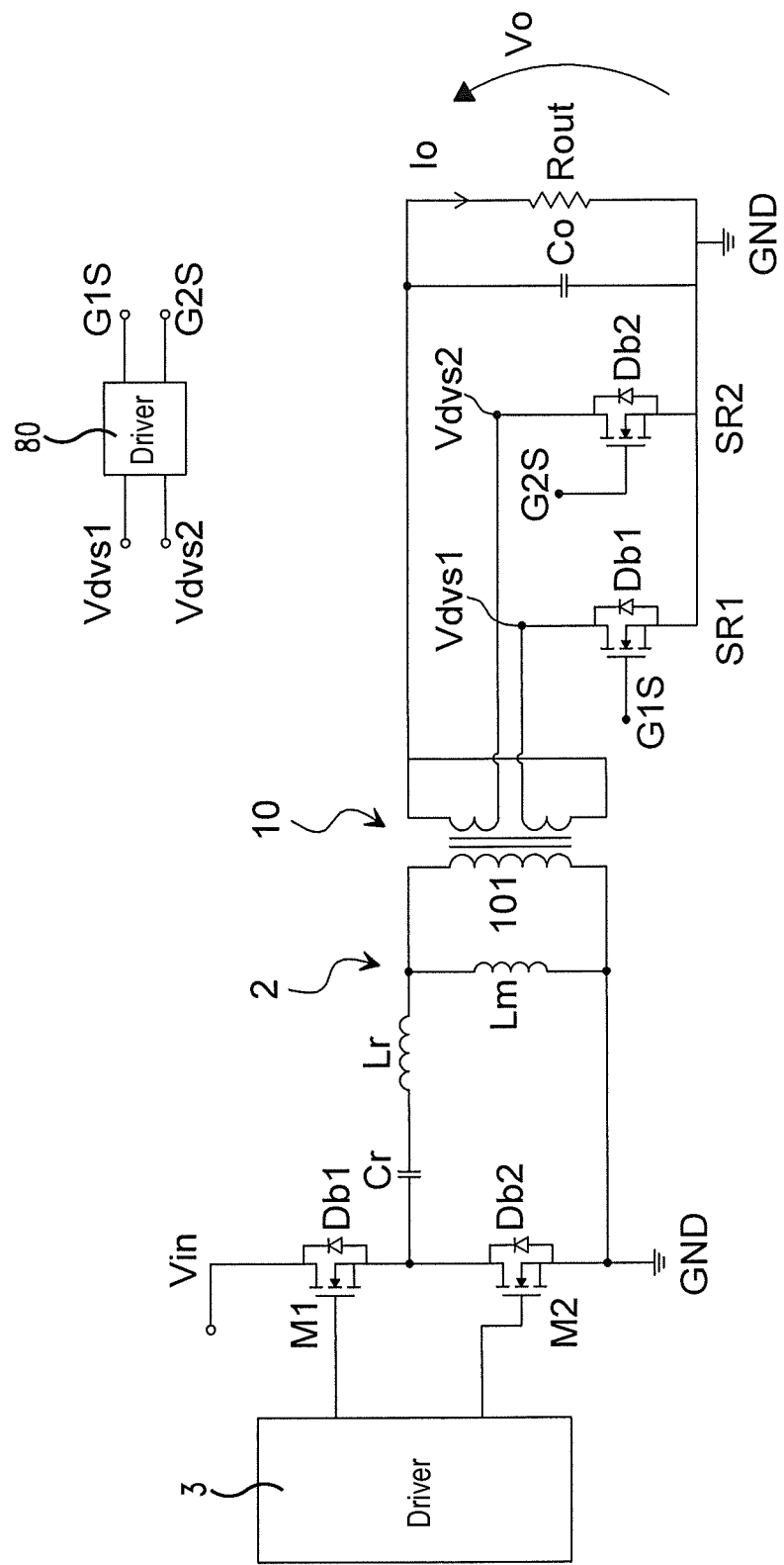
FIG. 2 is a diagram of an LLC-type resonant converter with a center-tapped secondary winding and rectification of the output current by means of synchronous rectifier according to prior art.
Figure 3:
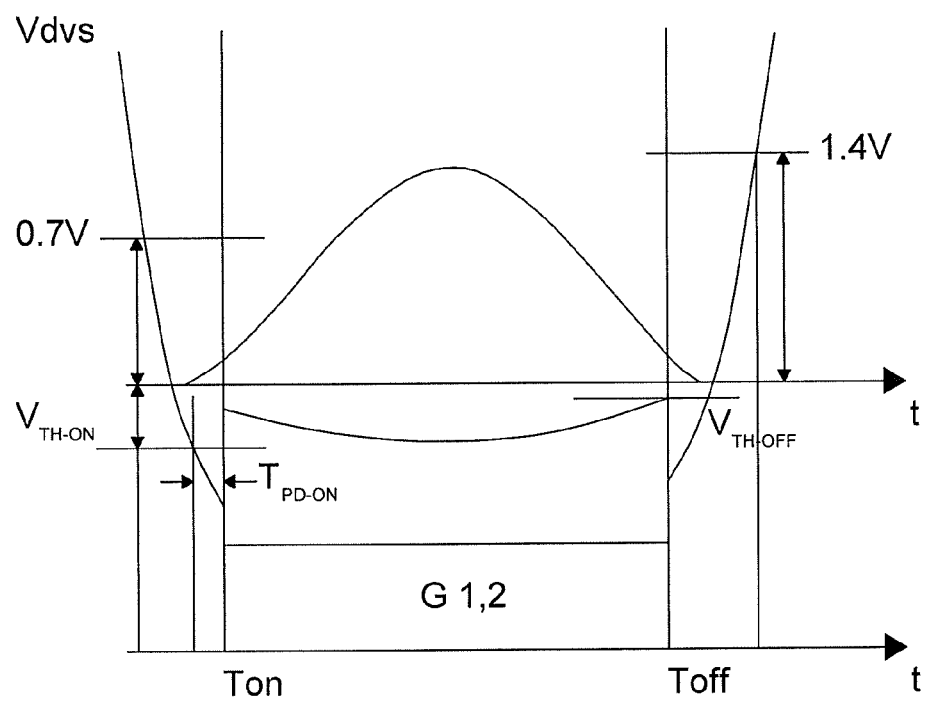
FIG. 3 shows the waveforms of the current flowing through a transistor of the rectifiers of FIG. 2 and of its drain source voltage.
Figure 6:
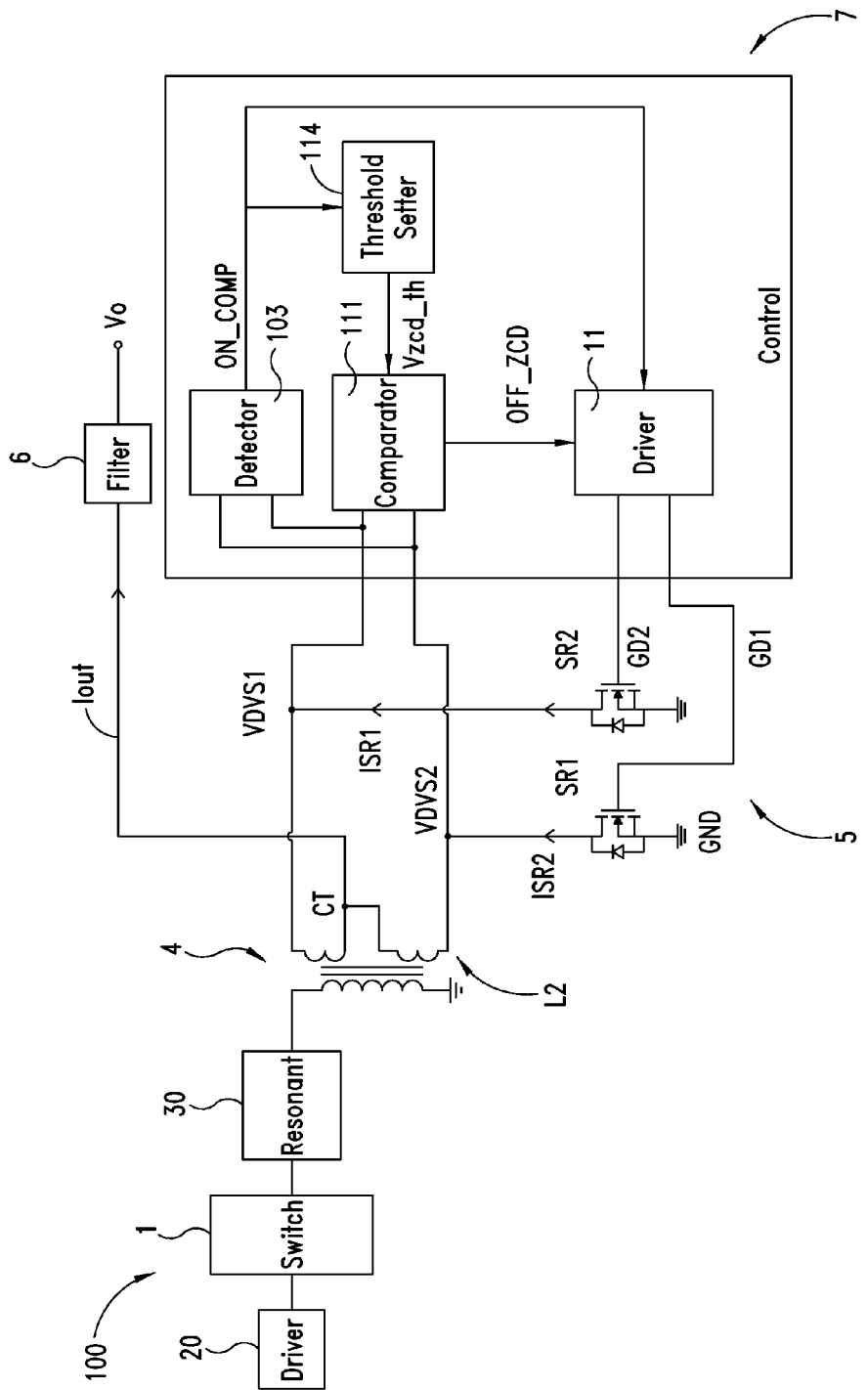
FIG. 6 is a block diagram of a switching converter comprising a control device for a rectifier of a switching converter according to the present disclosure.

A control device for a rectifier of a switching converter according to the present disclosure is shown in FIG. 6. The switching converter 100 comprises a power switching circuit block 1, powered by DC voltage and configured to generate a square wave with a certain frequency under the drive given by a first driver 20. For example, the power switching circuit block 1 could be a half-bridge or a full-bridge circuit (typically of MOSFET transistors) but other power switching circuit blocks could be equally adopted. The switching converter 100 comprises an impedance 30 connected to the primary winding of a transformer 4; the converter is adapted to provide an output current.

Preferably the switching converter 100 is an LLC resonant converter and the impedance 30 is a resonant circuit.

The square wave generated by the power switching circuit block 1 is applied to a resonant circuit 30 tuned to the fundamental frequency of the square wave. In this, manner, because of its selective characteristics, the resonant circuit 30 responds principally to this fundamental component and to a negligible degree to higher-order harmonics. It follows that the circulating power can be modulated by varying the frequency of the square wave, while maintaining the duty cycle constant at 50%, and that, according to the configuration of the resonant circuit 3, the currents and/or voltages associated with the power flow will have a pattern that is sinusoidal or sinusoidal at intervals.

Said resonant circuit 3 is coupled to a transformer 4, comprising a primary L1 and center-tapped secondary L2 windings.

A rectifier 5 comprising at least a transistor SR1, SR2 is coupled to the center-tapped secondary winding L2 of the transformer 4. Preferably, the rectifier 5 comprises a pair of transistors SR1 and SR2 which have the drain terminals connected with respective terminals of two portions of the center-tapped secondary winding L2 and the source terminals connected with ground reference GND. The center-tap CT of the secondary winding L2 is then connected to a filter 6 which provides the output current Iout and output voltage Vo. Said filter could be a common parallel of a capacitor and a resistance.

Said two transistors SR1, SR2 are preferably two MOSFET transistors with respective body diodes Dbr1, Dbr2 and a suitably low on-resistance Ron, such that the drain-source voltage drop across it is significantly low as compared to the voltage drop across a diode, like in prior art rectifier configurations.

A control device 7 drives the rectifier 5; preferably the control device 7 drives synchronously said transistors pair SR1 and SR2 by means of two signals GD1 and GD2, applied to the drivable terminal of the transistor SR1 and SR2, respectively. The control device 7 has as its inputs the drain-source voltages Vdvs1 and Vdvs2 of the transistors SR1, SR2, and outputs the two control signals GD1, GD2, respectively for the transistors SR1, SR2. A set of further signals and other temporal parameters which are used by control device 7 are described below.

Particularly, said control device 7 comprises a driving circuit 11 which provides the control signals GD1, GD2 to the transistors SR1, SR2.

According to a preferred embodiment of the present disclosure the driving circuit 11 receives the output signals of a detecting circuit 103 and from a comparator 111 both having at the input the drain-source voltage Vdvs1 or Vdvs2 of the transistors SR1, SR2.

The comparator 111 (FIG. 8) is configured to detect when the drain-source voltage Vdvs1, Vdvs2 crosses a voltage threshold Vzcd_th by providing, as a response, an output signal OFF_ZCD. Particularly the comparator 111 comprises at least an operational amplifier having at the non-inverting terminal the drain-source voltages Vdvs1, Vdvs2 of the at least one transistor SR1, SR2 and the inverting terminal connected with the voltage threshold Vzcd_th; the comparator 111 is configured to provide to the driving circuit 11 the output signal OFF_ZCD which, as a response, turns off the at least one transistor SR1, SR2 by means of the control signal GD1, GD2.

The voltage threshold Vzcd_th is provided by a setting circuit 114 comprising an electric path between the power supply voltage Vdd and ground reference GND which includes a current generator G1 connected by means of a switch SW1 to a capacitor C3 (FIG. 8); the voltage threshold Vzcd_th is the voltage across the capacitor C3. The common terminal of the switch SW1 and the capacitor C3 is coupled with the inverting terminal A of the operational amplifier 111. A further electric path is connected between said inverting terminal A and ground reference GND and it includes another current generator G2 in series with another switch SW2.

The detecting circuit 103 is configured to detect when the drain-source voltage Vdvs1 or Vdvs2 crosses a voltage threshold Vthbd (typically −200 mV) by providing, as a response, an output signal ON_COMP. Particularly the detecting circuit 103 comprises a comparator circuit configured to provide an output pulse signal which starts when the drain-source voltage Vdvs1, Vdvs2 of the transistor SR1, SR2 goes under the fixed voltage threshold Vthbd and ends when said drain-source voltage Vdvs1, Vdvs2 rises reaching the same fixed voltage threshold Vthbd.

Figure 7:
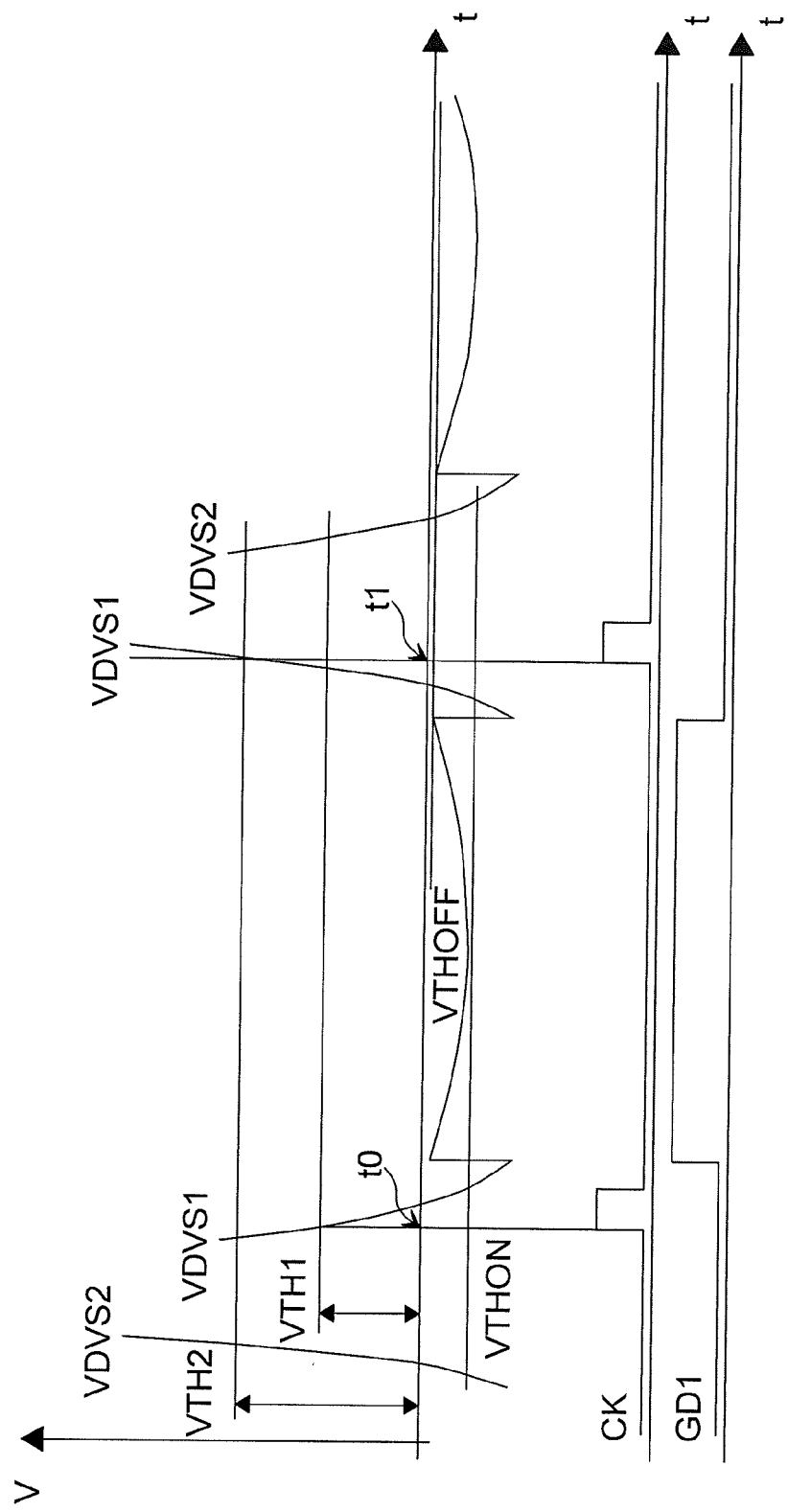
FIG. 7 is a time diagram of the waveforms of the drain-source voltages of the transistors of a synchronous rectifier of prior art.

Each switching half-cycle SC of the converter 100 involves alternately one of the two transistors of the transistor pair SR1, SR2, and in particular each half-cycle SC begins when the drain-source voltage Vdvs1, Vdvs2 is equal to a threshold value of 0.7V and ends when the drain-source voltage Vdvs1, Vdvs2 reaches a threshold value of 1.4V (FIG. 7). More particularly, the control device 7 provides a synchronizing signal CK which, for every switching half-cycle SC, comprises a first pulse when drain-source voltage Vdvs1, Vdvs2 is equal to 0.7V, and a second subsequent pulse when the drain-source voltage Vdvs1, Vdvs2 reaches 1.4V. Both the first and the second pulses have a given width equal to CK_width.

Said signals ON_COMP and CK are provided by the control circuit 7 to control respectively the switch SW1 and the switch SW2.

As already above-mentioned, the presence of parasitic inductances Ldrain, Lsource and Ltrace determines an undesired earlier turn-off $T_{off}$ of the transistors SR1, SR2, as shown in FIG. 4 where the drain-source voltage Vdvs1 or Vdvs2 and the desired voltage Vdvs-ideal are shown. The residual conduction time $T_{diode}$ of the body diode Dbr1 or Dbr2 increases, causing a loss of efficiency (indicate with LE in FIG. 4) due to the higher voltage drop across the body diode Dbr1 or Dbr2.

For example, a typical starting body diode residual conduction time $T_{diode}$ could be of 1 micro second, while a typically desired time $T_{diode}$ value is 60 nanoseconds.

Considering FIG. 7, the transistor SR1 is operative during the first half-cycle SC of the switching cycle SW while the transistor SR2 is operative during the second half-cycle SC of the switching cycle SW.

The drain-source voltages Vdvs1, Vdvs2 and the currents ISR1, SR2 of the MOSFET transistors SR1 and SR2 have a temporal trend as shown in FIG. 7. Each switching cycle of the converter 100 comprises the alternately turning on and off the transistors SR1, SR2; therefore each switching half-cycle SC of the converter 100 involves alternately one of the two transistors of the pair SR1, SR2, and in particular each half-cycle SC begins when the drain-source voltage Vdvs1 or Vdvs2 is equal to a threshold value Vth1 of preferably 0.7V and ends when the same drain voltage Vdvs1 or Vdvs2 reaches a threshold value Vth2 preferably of 1.4V. For example, in an application with a converter switching frequencies of 100 KHz the half-cycle SC is equal to 5 micro seconds.

Considering the start switching cycle SW, and particularly the start switching half-cycle SC wherein the transistor SR1 has to turned on, the control device 7 according to a preferred embodiment of the present disclosure is configured to, cycle by cycle, verify if the drain-source voltage Vdvs1 of the transistor SR1 is greater or less than the voltage threshold Vzcd_th. In the case wherein the drain-source voltage Vdvs1 is greater than the voltage threshold Vzcd_th, the control device 7 turns off the transistor SR1, measures the conduction time $T_{diode}$ of the body diode Dbr1 and increases the voltage threshold Vzcd_th by a quantity Vincr-th for the next switching cycle.

The operational amplifier 111 having at the non-inverting terminal the drain-source voltage Vdvs1 and the inverting terminal connected with the voltage threshold Vzcd_th provides the output signal OFF_ZCD to the driving circuit 11 to turn off the transistor SR1.

The quantity Vincr-th is variable because it depends on the conduction time $T_{diode}$ of the body diode Dbr1 of the transistor SR1. In fact the charge of the capacitor C3 depends on the duration of the signal ON_COMP which controls the switch SW1; the signal ON_COMP is a function of the body diode residual conduction time $T_{diode}$ which is measured after the turning off of the transistor SR1.

This occurs in the case of a fast load transient, for example when the LLC converter works above resonance and there is the risk of a surging of the drain-source voltages Vdvs1 and consequently an inversion of the current Isr flowing through the transistor SR1.

Figure 11:
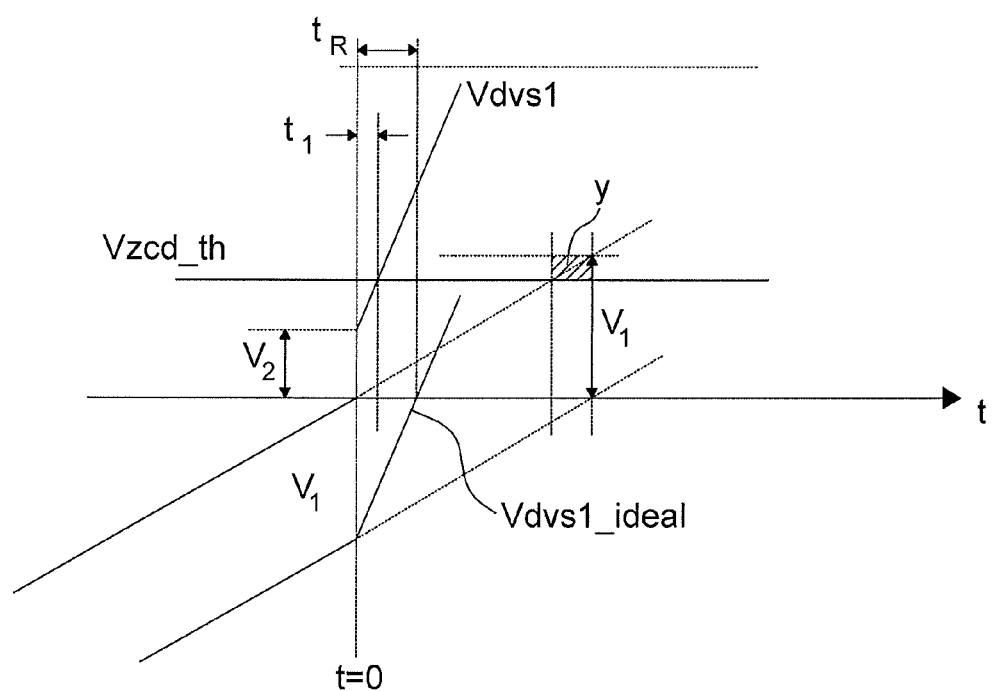

As is shown in FIG. 11, it is supposed that at the time instant t=0 a voltage peak occurs, due to a fast load transient. For t<0 the drain-source voltage Vdvs1 due to the parasitic inductance Lstray is given by the formula $$Vdvs1 = -Rdson \times ISR1 - Lstray \times \frac{\partial ISR1}{\partial t},$$

wherein the term $$V1 = Lstray \times \frac{\partial ISR1}{\partial t}$$

allows an upper translation of the ideal drain-source voltage Vdvs1_ideal given by the term −Rdson×ISR1.

At the time t=0 there is the slope change of the drain-source voltage Vdvs1 and from this point the drain-source voltage Vdvs1 becomes $$Vdvs1 = -Rdson \times ISR1 - Lstray \times \frac{\partial ISR1}{\partial t} + Lstray \times \left[\left(\frac{\partial ISR1}{\partial t}\right)_{t>0} - \left(\frac{\partial ISR1}{\partial t}\right)_{t<0}\right].$$

The term $$V2 = Lstray \times \left[\left(\frac{\partial ISR1}{\partial t}\right)_{t>0} - \left(\frac{\partial ISR1}{\partial t}\right)_{t<0}\right]$$

gives a further upper translation of the drain-source voltage Vdvs1 and, from this point the voltage threshold Vzcd_th is reached in a time instant $t_1$ less than the time instant $t_R$ wherein the ideal drain-source voltage Vdvs1_ideal would crossed the zero level; therefore the current inversion is avoided.

Considering a linear approximation of the current ISR1 in proximity of the point t=0, it is obtained:

$$ISR1 = \begin{cases} tK_{OP} - I_0 & t \leq 0 \\ tK_{AR} - I_0 & t > 0 \end{cases}$$

where $I_0$ is the value of the current ISR1 next the time instant t=0. The drain source voltage Vdvs1 will be:

$$Vdsv1_{0-} = -Rdson \times ISR1 - Lstray \times \frac{\partial ISR1}{\partial t}$$
$$= -Rdson \times ISR1 + Lstray \times K_{OP}$$

$$Vdsv1_{0+} = -Rdson \times ISR1 - Lstray \times \left(\frac{\partial ISR1}{\partial t}\right)_{t<0} +$$
$$Lstray \times \left[\left(\frac{\partial ISR1}{\partial t}\right)_{t>0} - \left(\frac{\partial ISR1}{\partial t}\right)_{t<0}\right]$$
$$= -Rdson \times ISR1 + Lstray \times K_{AR}$$

where $Vdsv1_{0-}$ and $Vdsv1_{0+}$ are respectively the values of the drain source voltage Vdvs1 before the time instant t=0 and after the time instant t=0.

By equaling the drain-source voltage Vdvs1 at the time instant $t_1$ with the voltage threshold Vzcd_th, it is obtained: $Vdvs1(t_1)=Vzcd_{th}$ where $Vdvs1(t_1)=Vdvs1_{0+}+Ron \cdot K_{AR} \cdot t_1$ and the term $Ron \cdot K_{AR} \cdot t_1$ is a liner contribution. By approximating $Vzcd\_th \approx K_{OP} \cdot Lstray$, the time instant $t_1$ through the following calculating steps is:

$$Vdvs1_{0+} + Ron \cdot K_{AR} \cdot t_1 = K_{OP} \cdot Lstray \Rightarrow t_1$$
$$= \frac{1}{Ron \cdot K_{AR}} \cdot (K_{OP} \cdot Lstray - Vdvs1_{0+}).$$

On the other hand $Vdvs1(t_R)=Vdvs1_{0+}+Ron \cdot K_{AR} \cdot t_R$ and at the same time $Vdvs1(t_R)=V1+V2=Lstray \cdot K_{AR}$, being the sum of the two contributions above discussed, it is possible to obtain the time instant $t_R$ of the ideal current inversion obtained:

$$Vdvs1_{0+} + Ron \cdot K_{AR} \cdot t_R = \frac{1}{Ron \cdot K_{AR}} \cdot Lstray \cdot K_{AR} \Rightarrow t_R$$
$$= \frac{1}{Ron \cdot K_{AR}} \cdot (K_{AR} \cdot Lstray - Vdvs1_{0+})$$

The time difference $\Delta t=t_R-t_1$ is always a positive quantity and particularly is given by the formula:

$$\Delta t = t_R - t_1 = \frac{Lstray}{Ron} \cdot \left(1 - \frac{K_{OP}}{K_{AR}}\right)$$

In this, way the transistor is turned off a $\Delta t$ before the current inversion.

In the case wherein the drain-source voltage Vdvs1 is lower than the voltage threshold Vzcd_th, the control device 7 measures the conduction time $T_{diode}$ of the body diode Dbr1 of the transistor SR1 and verify that the measured conduction time $T_{diode}$ is greater or less than a threshold value $T_{th}$. In the case wherein the measured conduction time $T_{diode}$ is greater than the threshold value $T_{th}$, the control device 7 delays the off time instant $T_{off}$ of transistor SR1 by a fixed quantity $T_{step}$ in the next switching cycle, cycle by cycle until the measured conduction time $T_{diode}$ is less than the threshold value $T_{th}$. In the case wherein the measured conduction time $T_{diode}$ is lower than the threshold value $T_{th}$, the control device advances the off time instant $T_{off}$ of the transistor SR1 by said fixed quantity $T_{step}$ in the next switching cycle.

Figure 10:
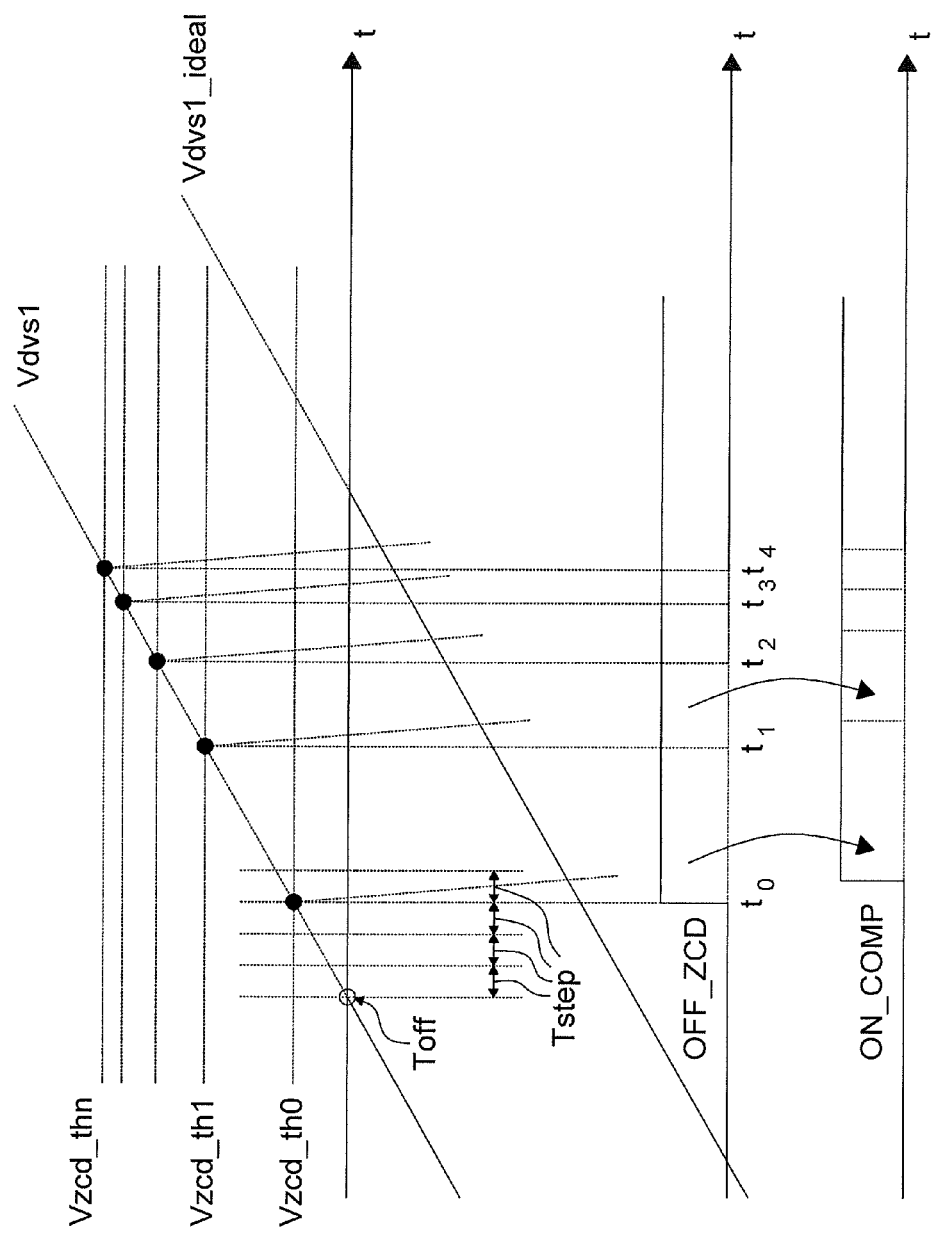

Thus continuing there will be the operating trend as shown in FIG. 10: when the off time $T_{off}$ of the transistor SR1 is delayed by steps of $T_{step1}$, the drain-source voltage Vdvs1 increases. In this way, even if no fast load transitions occurs, a number of forced turn off of the transistor SR1 due to the reaching of the different threshold voltages Vzcd_th0, Vzcd_th1, . . . , Vzcd_thn by the drain-source voltage Vdvs1 occurs. Therefore during the operation of the control circuit 7 the transistor SR1 will be turned off sometime when the drain-source voltage Vdvs1 reaches one of the progressively increasing threshold voltages Vzcd_th0, Vzcd_th1, . . . , Vzcd_thn. Furthermore, as is possible to see in FIG. 10, the quantity Vincr-th for increasing the threshold voltages Vzcd_th0, Vzcd_th1, . . . , Vzcd_thn is a progressively decreasing value which depends on the progressive decrease of the conduction time $T_{diode}$ and in turn of the charging time of the capacitor C3.

Figure 9:
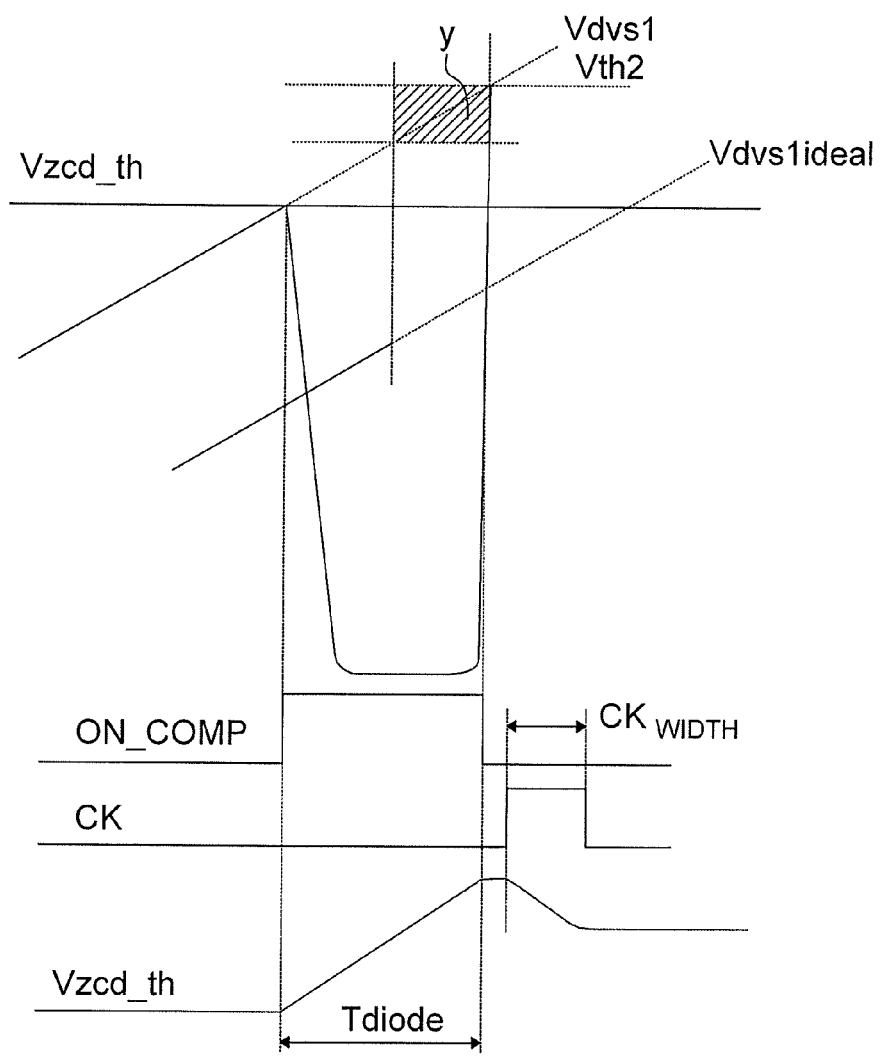
FIGS. 9-11 show the waveforms of some signals in play in the control device of FIG. 8.

The steady state is reached when the measured conduction time $T_{diode}$ is equal or lower than the threshold value $T_{th}$; the threshold voltage will not be increased and the last threshold voltage Vzcd_thn will be constantly inside an area Y (FIG. 9, 11).

Figure 8:
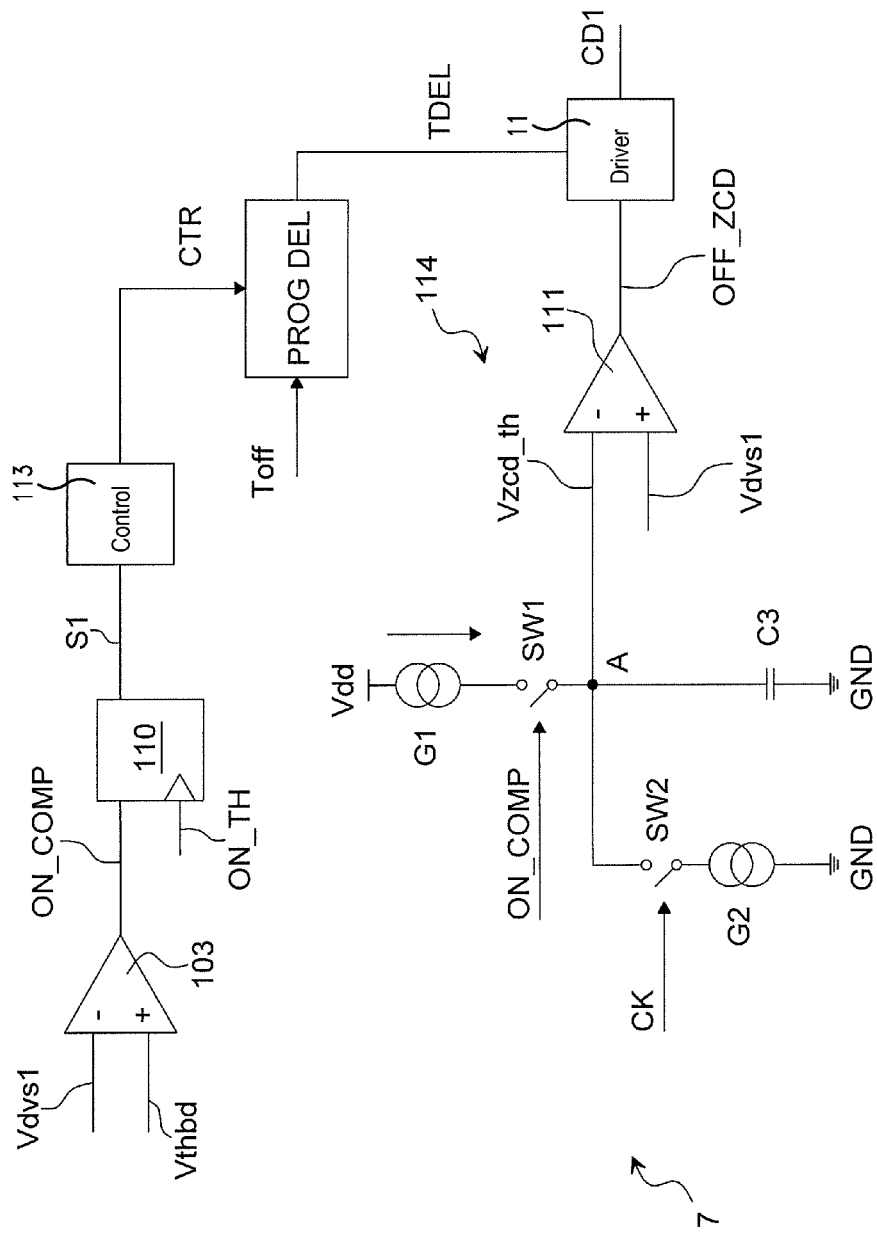
FIG. 8 shows more in detail the control device of FIG. 6 according to a preferred embodiment of the present disclosure.

A possible implementation of the driving circuit 11 is shown in FIG. 8. The driving circuit 11 comprises a first edge triggered FLIP-FLOP 110 having at the input the pulse signal ON_COMP and has a signal ON_TH as a synchronizing input signal; the signal ON_TH is a pulse signal having a rising edge of the pulse which is delayed with respect to the rising edge of the pulse signal ON_COMP by the time interval equal to $T_{th}$. The signal ON_COMP is sampled by the signal ON_TH, so that, if the signal ON_TH rises to the high logic level before the signal ON_COMP falls to the low logic level, both the signals are high and the first FLIP-FLOP 110 generates an output signal S1 equal to "1" (which means that the time $T_{diode}$ is greater than the time period $T_{th}$) otherwise, if the signal ON_TH rises to the high logic level after the signal ON_COMP falls to the low logic level, the output signal S1 is equal to "0" (which means that the time $T_{diode}$ is lower than the time period $T_{th}$).

The output signal S1 is at the input of a control logic circuit 113 which processes said signal S1 and generates a control signal CTRL in response to the signal S1; the control signal CTRL is responsible for setting the off time delay $T_{step}$ of the off time instant $T_{off}$. By means of the control signal CTRL is possible to choose the value of the time delay Tstep cycle by cycle.

The $T_{off}$ signal is at the input of a programmable delay block PROG DEL adapted to generate the signal $T_{del}$ which is sent at the input of the driving circuit 11. The control signal CTRL acts on said programmable delay blocks PROG DEL.

The signal ON_COMP is enabled by the control circuit 7 to drive the switch SW1 in the case when the drain-source voltage Vdvs1 is greater than the voltage threshold Vzcd_th0, Vzcd_th1, . . . , Vzcd_thn while the signal CK is enabled by the control circuit 7 to drive the switch SW2.

In this way, the switch SW1 will be closed for the duration of the conduction time $T_{diode}$ of the body diode Db2, while the SW2 will be closed for the duration CK_width of the step of the synchronizing signal CK. During the conduction time $T_{diode}$ the ON-COMP signal will be high and the current provided by the current generator G1 will charge the capacitor C3, increasing the voltage Vzcd_th across it of the variable quantity Vincr-th as a function of the conduction time $T_{diode}$ (FIG. 9). When the drain-source voltage Vdvs1 reaches the value Vth2 (1.4V) the synchronizing signal CK will be high and the capacitor C3 is discharged by the current provided by the current generator G2 decreasing the voltage threshold Vzcd_th of a little fixed quantity function of the time CK_width. Therefore the capacitor C3 is charged by the current generator G1 for a time period equal to the measured conduction time $T_{diode}$ and is discharged by the current generator G2 for a time period equal to the time interval CK_width wherein the time interval CK_width is always lower than the measured conduction time $T_{diode}$; in this way the progressively increasing threshold voltages Vzcd_th0, Vzcd_th1, . . . , Vzcd_thn are generated.

Preferably, CK_width is chosen equal to the time period $T_{th}$ which is the desired target of the conduction time and preferably equal to 60 nanoseconds.

According to another embodiment of the present disclosure the driving circuit 11 receives the output signal of the comparator 111 having at the input the drain-source voltage Vdvs1 or Vdvs2 of the transistors SR1, SR2.

Figure 12:
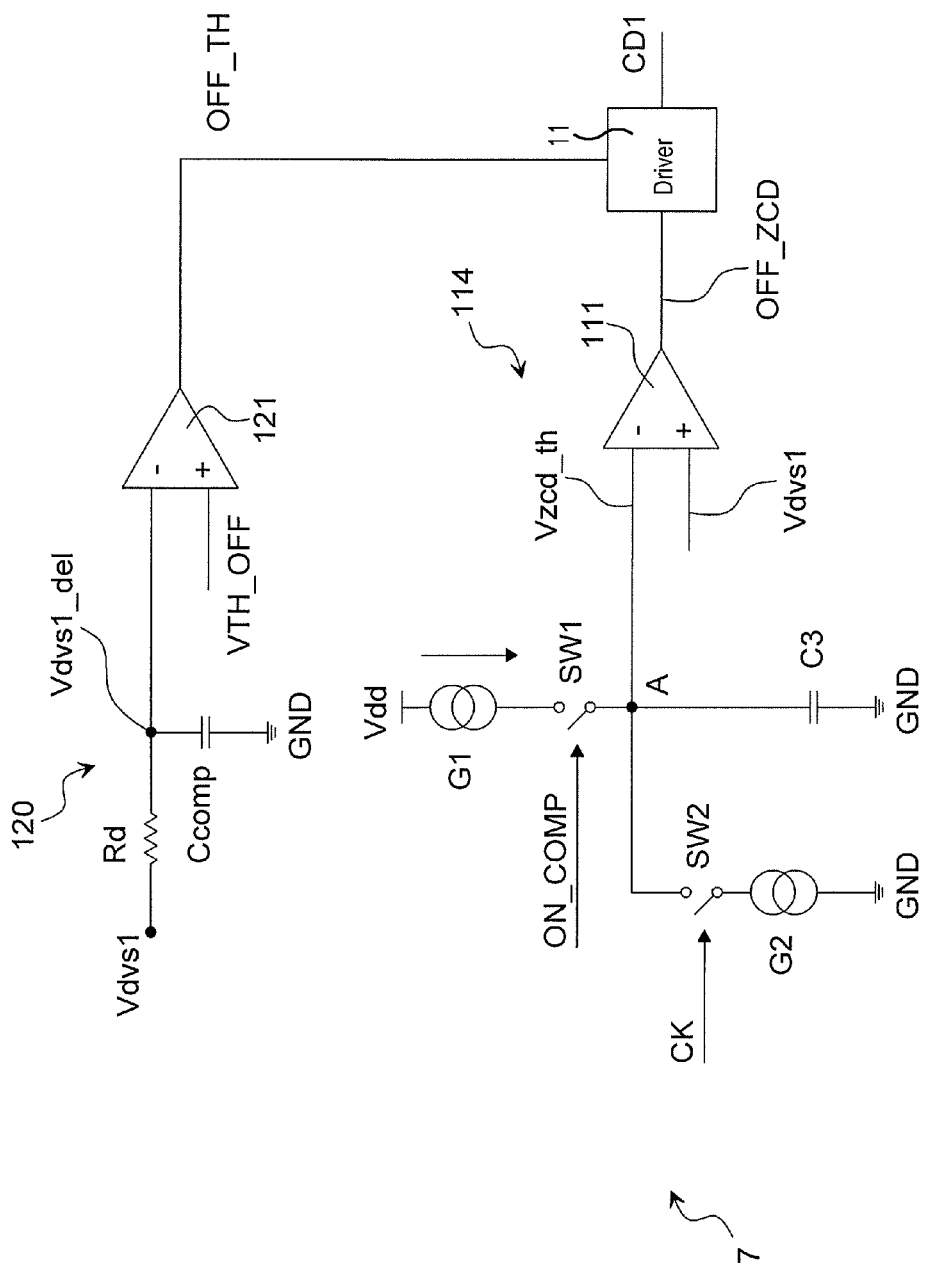
FIG. 12 shows the control device in FIG. 6 according to another embodiment of the present disclosure.

The control device 7 comprises the comparator circuit 111, the setting circuit 114 and another circuit 120 (FIG. 12) including a RC filter provided with an external capacitor Ccomp and a tunable resistor Rd and connected with an inverting terminal of an operational amplifier 121 having at the non-inverting terminal the voltage threshold $V_{TH-OFF}$. The voltage at the input of the RC filter is the drain-source voltage Vdvs1 while the voltage at the inverting terminal of the operational amplifier 121 is the voltage Vdvs1-del which is the voltage Vdvs1 delayed by means of the filter RC.

Considering the start switching cycle SW, and particularly the start switching half-cycle SC wherein the transistor SR1 has to turned on, the control device 7 according to said another embodiment of the present disclosure is configured to, cycle by cycle, verify if the drain-source voltage Vdvs1 of the transistor SR1 is greater or less than the voltage threshold Vzcd_th. In the case wherein the drain-source voltage Vdvs1 is greater than the voltage threshold Vzcd_th, the control device 7 turns off the transistor SR1, measures the conduction time $T_{diode}$ of the body diode Dbr1 and increases the voltage threshold Vzcd_th of a quantity Vincr-th for the next switching cycle.

The operational amplifier 111 having at the non-inverting terminal the drain-source voltage Vdvs1 and the inverting terminal connected with the voltage threshold Vzcd_th provides the output signal OFF_ZCD to the driving circuit 11 to turn off the transistor SR1.

The quantity Vincr-th is variable because it depends on the conduction time $T_{diode}$ of the body diode Dbr1 of the transistor SR1. In fact the charge of the capacitor C3 depends on the duration of the signal ON_COMP which controls the switch SW1; the signal ON_COMP is a function of the body diode residual conduction time $T_{diode}$ which is measured after the turning off of the transistor SR1.

In the case wherein the drain-source voltage Vdvs1 is lower than the voltage threshold Vzcd_th, the control device 7 turns off the transistor SR1 when the voltage Vdvs1-del reaches the voltage threshold $V_{TH-OFF}$ and the driving circuit 11 receives the signal OFF-TH from the circuit 120.

Figure 13:
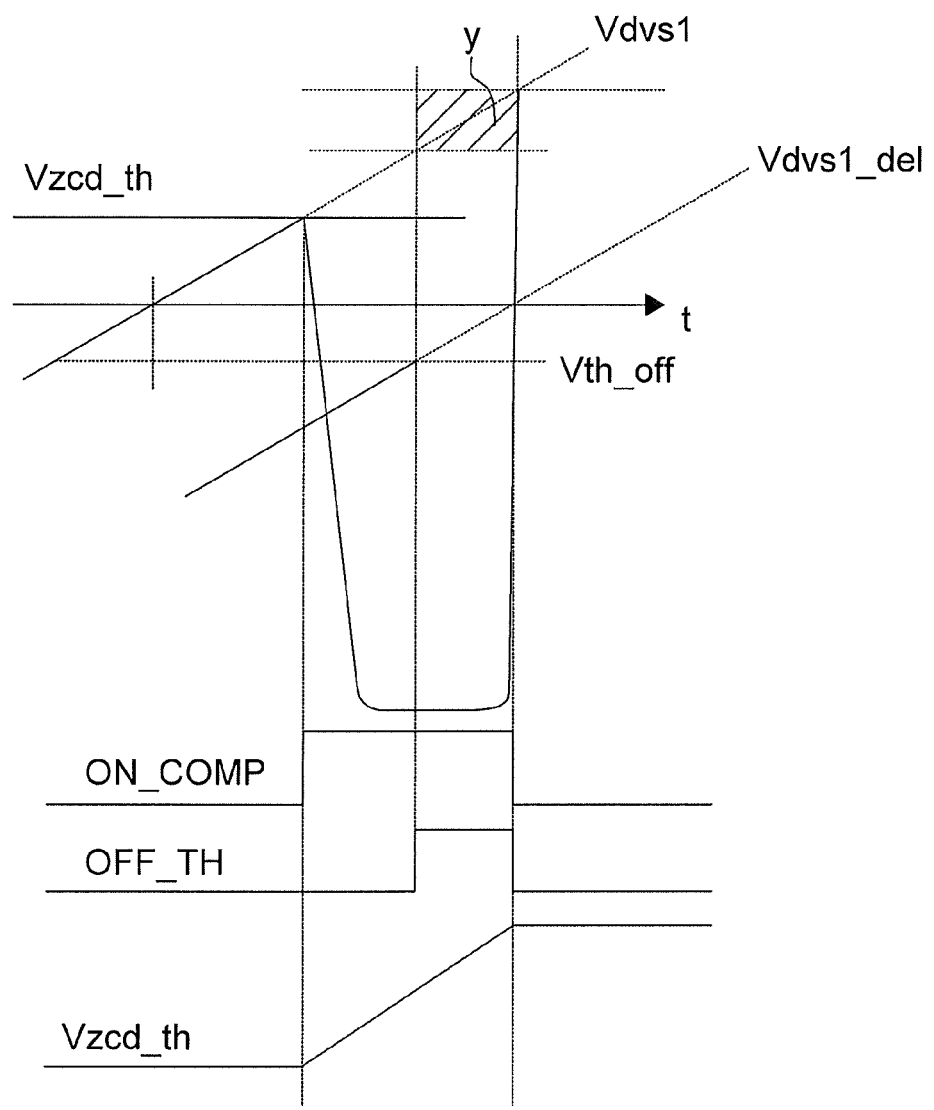
FIG. 13 shows the waveforms of some signals in play in the control device of FIG. 12.

Thus continuing there will be the operating trend as shown in FIG. 13; the voltage threshold Vzcd_th is increased of a variable quantity Vincr-th every time that the drain-source voltage Vdvs1 is greater than the voltage threshold Vzcd_th; in this way the control device 7 is configured to set progressively increasing threshold voltages Vzcd_th0, Vzcd_th1, . . . , Vzcd_thn of the variable quantity Vincr-th that progressively decreases depending on the progressive decrease of the measured conduction time $T_{diode}$. When the voltage Vdvs1-del reaches the voltage threshold $V_{TH-OFF}$ with the drain-source voltage Vdvs1 less than the voltage threshold Vzcd_th the voltage threshold Vzcd_th is not increased.

The control device 7 according to the above mentioned preferred embodiment or according to the above mentioned another embodiment of the present disclosure controls the other transistor SR2 of the rectifier 5 in the switching half-cycles wherein the transistor SR2 has to turned on in the same way as already mentioned for the transistor SR1.

That is the control device 7 according to the above mentioned preferred or the another embodiment of present disclosure operates in the same manner as above-mentioned even for the transistor SR2 in the other switching half-cycle of the converter switching cycle SW in the case wherein the rectifier comprises two transistors SR1, SR2. Preferably different quantities Vincr-th are used for controlling the transistors SR1 and SR2; even preferably different values of the quantities $T_{step}$ are used for both the first and second turn-on and off signals GD1, GD2.

Preferably the control device 7 comprises two control sections dedicated for each transistor, one section to control the transistor SR1 and another section for controlling the transistor SR2.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device, comprising:
    a driver circuit configured to generate a first control signal configured to turn on and turn off a first transistor of a rectifier of a switching controller;
    a measuring circuit configured to measure a conduction time of a body diode of the first transistor during each of plural converter switching cycles;
    a comparison circuit configured to output a comparison signal indicative of whether a drain-source voltage of the first transistor is equal to or less than a voltage threshold, wherein the driver circuit is configured, in response to the comparison signal indicating that the drain-source voltage is greater than the voltage threshold, to turn off the first transistor and increase, in a next switching cycle, the voltage threshold by a quantity based on a measurement of the conduction time of the body diode;
    wherein the measuring circuit is configured to determine whether the measured conduction time is greater or less than a threshold value;
    wherein the driver circuit is configured to, in response to the measuring circuit determining that the measured conduction time is greater than the threshold value, delay an off time instant of the transistor by a fixed quantity in the next switching cycle, cycle by cycle until the measured conduction time is equal to or less than the threshold value; and
    wherein the driver circuit is configured to, in response to the measuring circuit determining that the measured conduction time is equal to or less than the threshold value, maintain said voltage threshold.

2. The control device according to claim 1, comprising a delay circuit configured to obtain a delayed drain-source voltage by delaying the drain-source voltage of the transistor, wherein the driver circuit is configured to turn off said transistor in response to determining that the drain-source voltage of the transistor is less than the voltage threshold and the delayed drain-source voltage reaches another voltage threshold.

3. The control device according to claim 1, comprising a threshold setting circuit configured to vary said quantity as a function of the measured conduction time of the body diode of the at least one transistor.

4. The control device according to claim 3, wherein said threshold setting circuit includes capacitor configured to be charged by a current for a time period depending on said measured conduction time of the body diode of the transistor, the threshold setting circuit being configured to set the quantity based on the time period.

5. The control device according to claim 3, wherein the threshold setting circuit is configured to set progressively increasing threshold voltages by the quantity which progressively decreases depending on a progressive decrease of said measured conduction time.

6. A method, comprising:
    controlling a rectifier of a switching converter, the controlling including:
    determining whether a drain-source voltage of a transistor of the rectifier is equal to or less than a voltage threshold;
    generating a turn off signal, configured to turn off the transistor, in response determining that the drain-source voltage is equal or less than the voltage threshold;
    measuring a conduction time of a body diode of the transistor during each of a plurality of switching cycles; and
    increasing, in a next switching cycle, the voltage threshold by a quantity based on the measured conduction time;
    wherein, in response to determining that the drain-source voltage of the transistor is less than the voltage threshold, the method further comprises:
        determining whether the measured conduction time is greater or less than a threshold value, and
        if the measured conduction time is greater than the threshold value,
    delaying an off time instant of the transistor by a fixed quantity in the next switching cycle, cycle by cycle until the measured conduction time is equal to or less than the threshold value.

7. The method according to claim 6, wherein said quantity is variable and is a function of the measured conduction time of the body diode of the transistor.

8. The method according to claim 7, comprising setting progressively increasing threshold voltages by the quantity which progressively decreases depending on a progressive decrease of said measured conduction time.

9. A switching converter, comprising:
    a rectifier that includes a transistor; and
    a control device configured to control the rectifier, the control device including:
        a driver circuit configured to generate a first control signal configured to turn on and turn off a first transistor of a rectifier of a switching controller;
        a measuring circuit configured to measure a conduction time of a body diode of the first transistor during each of plural converter switching cycles; and
        a comparison circuit configured to output a comparison signal indicative of whether a drain-source voltage of the first transistor is equal to or less than a voltage threshold, wherein the driver circuit is configured, in response to the comparison signal indicating that the drain-source voltage is greater than the voltage threshold, to turn off the first transistor and increase, in a next switching cycle, the voltage threshold by a quantity based on a measurement of the conduction time of the body diode; and wherein the measuring circuit is configured to determine whether the measured conduction time is greater or less than a threshold value;

wherein the driver circuit is configured to, in response to the measuring circuit determining that the measured conduction time is greater than the threshold value, delay an off time instant of the transistor by a fixed quantity in the next switching cycle, cycle by cycle until the measured conduction time is equal to or less than the threshold value; and wherein the driver circuit is configured to, in response to the measuring circuit determining that the measured conduction time is equal to or less than the threshold value, maintain said voltage threshold.

10. The switching converter according to claim 9, wherein the control device includes a delay circuit configured to obtain a delayed drain-source voltage by delaying the drain-source voltage of the transistor, wherein the driver circuit is configured to turn off said transistor in response to determining that the drain-source voltage of the transistor is less than the voltage threshold and the delayed drain-source voltage reaches another voltage threshold.

11. The switching converter according to claim 9, wherein the control device includes a threshold setting circuit configured to vary said quantity as a function of the measured conduction time of the body diode of the at least one transistor.

12. The switching converter according to claim 11, wherein said threshold setting circuit includes capacitor configured to be charged by a current for a time period depending on said measured conduction time of the body diode of the transistor, the threshold setting circuit being configured to set the quantity based on the time period.

13. The switching converter according to claim 11, wherein the threshold setting circuit is configured to set progressively increasing threshold voltages by the quantity which progressively decreases depending on a progressive decrease of said measured conduction time.

* * * * *